United States Patent [19]
Onan et al.

[11] Patent Number: 5,911,282
[45] Date of Patent: *Jun. 15, 1999

[54] WELL DRILLING FLUIDS CONTAINING EPOXY SEALANTS AND METHODS

[75] Inventors: David D. Onan; Jiten Chatterji; Bobby J. King, all of Duncan; Roger S. Cromwell, Walters; Patty L. Onan, Duncan, all of Okla.

[73] Assignee: Halliburton Energy Services, Inc., Duncan, Okla.

[*] Notice: This patent issued on a continued prosecution application filed under 37 CFR 1.53(d), and is subject to the twenty year patent term provisions of 35 U.S.C. 154(a)(2).

[21] Appl. No.: 08/989,190

[22] Filed: Dec. 11, 1997

Related U.S. Application Data

[63] Continuation-in-part of application No. 08/914,594, Aug. 18, 1997.

[51] Int. Cl.$^6$ .................................................. E21B 43/02
[52] U.S. Cl. .......................... 175/72; 166/276; 166/295; 166/293; 166/300; 405/264
[58] Field of Search ....................... 175/65, 72; 166/276, 166/292, 293, 295, 300; 405/264

[56] References Cited

U.S. PATENT DOCUMENTS

| | | | |
|---|---|---|---|
| 3,082,823 | 3/1963 | Hower | 166/29 |
| 3,467,208 | 9/1969 | Kelly | 175/72 |
| 3,782,466 | 1/1974 | Lawson et al. | 166/254 |
| 3,933,204 | 1/1976 | Knapp | 166/295 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,072,194 | 2/1978 | Cole et al. | 166/295 |
| 4,101,474 | 7/1978 | Copeland et al. | 260/13 |
| 4,113,015 | 9/1978 | Meijs | 166/295 |
| 4,215,001 | 7/1980 | Elphingstone et al. | 252/8.55 C |
| 4,220,566 | 9/1980 | Constien | 260/13 |
| 4,272,384 | 6/1981 | Martin | 252/8.55 R |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles et al. | 166/300 |
| 4,785,884 | 11/1988 | Armbruster | 166/280 |
| 4,921,047 | 5/1990 | Summers | 166/276 |
| 4,972,906 | 11/1990 | McDaniel | 166/276 |
| 5,159,980 | 11/1992 | Onan et al. | 166/294 |
| 5,168,928 | 12/1992 | Terry et al. | 166/292 |
| 5,293,938 | 3/1994 | Onan et al. | 166/293 |
| 5,314,023 | 5/1994 | Dartez | 166/295 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,458,195 | 10/1995 | Totten et al. | 166/293 |
| 5,547,027 | 8/1996 | Chan et al. | 166/295 |
| 5,559,086 | 9/1996 | Dewprashad et al. | 207/219 |

FOREIGN PATENT DOCUMENTS

| | | | |
|---|---|---|---|
| WO 91/02703 | 7/1991 | WIPO | C04B 24/24 |
| WO 94/12445 | 9/1994 | WIPO | C04B 26/18 |

*Primary Examiner*—Roger Schoeppel
*Attorney, Agent, or Firm*—Craig W. Roddy; C. Clark Dougherty, Jr.

[57] ABSTRACT

The present invention provides improved well drilling fluids containing epoxy sealants and methods of drilling well bores using the drilling fluids. The drilling fluids basically include a base fluid selected from the group of water and oil, a viscosity increasing material and a hardenable epoxy sealant composition which becomes part of the filter cake formed on the walls of the well bore and hardens therein whereby the filter cake is consolidated into a stable solid mass.

26 Claims, No Drawings

WELL DRILLING FLUIDS CONTAINING EPOXY SEALANTS AND METHODS

RELATED U.S. APPLICATION DATA

This application is a continuation-in-part of application Ser. No. 08/914,594 filed on Aug. 18, 1997.

BACKGROUND OF THE INVENTION

1. Field of the Invention

The present invention relates generally to improved drilling fluids and methods of drilling subterranean well bores therewith, and more particularly, to such drilling fluids and methods wherein hardenable epoxy sealants contained in the drilling fluids are deposited on the walls of the well bores.

2. Description of the Prior Art

A variety of drilling fluids have been used heretofore in drilling subterranean well bores. The most commonly used such drilling fluids are solids-containing water based viscous gels which are often weighted with particulate weighting materials such as barite. Oil based drilling fluids are also utilized and are usually inverted oil-salt water emulsions containing organophilic clays, weighting materials and other additives. When a well bore is being drilled, the drilling fluid is circulated downwardly through the drill string, through the drill bit and upwardly in the annulus between the walls of the well bore and the drill string. The drilling fluid functions to maintain hydrostatic pressure on formations penetrated by the well bore and thereby prevent blow-outs and to remove cuttings from the well bore. As the drilling fluid is circulated, a filter cake of solids from the drilling fluid forms on the walls of the well bore. The filter cake build-up is a result of initial fluid loss into the permeable formations and zones penetrated by the well bore. The filter cake and gelled or partially gelled drilling fluid mixed therewith reduce additional fluid loss as the well is drilled.

After the well bore reaches its total depth, the drilling and circulation of drilling fluid are stopped. The well is then logged and a string of pipe, e.g., casing, is run into the well bore. After the pipe is run, the well bore has heretofore been conditioned by circulating drilling fluid downwardly through the pipe and upwardly through the annulus. The conditioning has been intended to remove filter cake and gelled or partially gelled drilling fluid from the walls of the well bore. Primary cementing operations have then been performed in the well bore, i.e., the string of pipe disposed and the well bore has been cemented therein by placing a cement slurry in the annulus and allowing it to set into a hard mass therein. When the cement slurry is run down the pipe and into the annulus, the drilling fluid in the pipe and the annulus is displaced therefrom.

The purpose of cementing the above mentioned string of pipe in the well bore is to provide physical support and positioning to the pipe and seal the annulus. That is, it is intended that the set cement in the annulus will bond to the pipe and to the walls of the well bore whereby the annulus is sealed in a manner which prevents pressurized fluid migration between subterranean zones and formations penetrated by the well bore. However, the sealing of the annulus is often frustrated by filter cake and gelled drilling fluid which remain on the walls of the well bore when primary cementing operations are commenced. That is, when the cement slurry is placed in the annulus and allowed to set therein, thin layers of unconsolidated filter cake solids and gelled drilling fluid often remain between the set cement and the walls of the well bore including the faces of permeable formations or zones containing pressurized fluids. Since the inert layers of unconsolidated solids do not have the physical properties necessary to prevent pressurized fluid migration, such migration takes place by way of flow channels formed through the layers.

While a variety of techniques have heretofore been developed in attempts to remove filter cake from the walls of well bores and increase the displacement efficiencies of gelled drilling fluids therefrom prior to cementing pipe therein, continuing needs remain for improved drilling fluids, methods of drilling and methods of sealing pipe in well bores.

SUMMARY OF THE INVENTION

By the present invention, improved drilling fluids and methods of utilizing the drilling fluids for drilling subterranean well bores are provided which meet the needs described above and overcome the shortcomings of the prior art. In addition, the methods of the present invention include the effective sealing of pipe strings in well bores utilizing epoxy sealant compositions which are highly resilient and long lasting.

The improved drilling fluids of the present invention for use in drilling subterranean well bores are basically comprised of a water based or oil based drilling fluid containing viscosity increasing materials, weighting materials and other components including a hardenable epoxy sealant composition dispersed therein. When the drilling fluid forms filter cake on the walls of a well bore being drilled, the hardenable epoxy sealant becomes a part of the filter cake and subsequently hardens therein whereby the filter cake is consolidated into a stable solid mass.

The consolidation of the filter cake into a solid mass is highly beneficial in that it causes the filter cake to provide greater fluid loss control, to prevent or greatly reduce the occurrence of lost drilling fluid circulation and to prevent or reduce the influx of pressurized formation gas into the well bore during and after the sealing of a pipe string therein. In addition, after the well bore is drilled and a string of pipe has been run therein, the pipe can be sealed within the well bore by additional hardenable epoxy sealant composition that readily bonds to the solidified filter cake. Since the hardened epoxy sealant composition produces a very strong bond to the pipe surface as well as to the solidified walls of the well bore and the epoxy sealant composition is highly flexible and resilient, a greatly superior and longer lasting seal between the well bore and the string of pipe is obtained.

The improved methods of the present invention for drilling a subterranean well are basically comprised of the steps of preparing a water or oil based drilling fluid which forms a filter cake on the walls of the well bore as the well bore is drilled which includes a hardenable epoxy sealant composition dispersed therein which becomes a part of the filter cake formed on the walls of the well bore. When the epoxy sealant composition hardens in the filter cake, the filter cake is consolidated into a stable solid mass. When the well bore being drilled reaches total depth and a string of pipe is run into the well bore, an epoxy sealant composition is placed between the pipe and the walls of the well bore and allowed to harden therein.

It is, therefore, a general object of the present invention to provide improved drilling fluids and methods of using the drilling fluids for drilling subterranean well bores.

A further object of the present invention is the provision of improved drilling fluids and methods of drilling well bores whereby when pipe strings are cemented in the well bores, greatly improved seals between the pipe strings and the walls of the well bores are obtained.

Other and further objects, features, and advantages of the present invention will be readily apparent to those skilled in the art upon a reading of the description of preferred embodiments which follows.

DESCRIPTION OF PREFERRED EMBODIMENTS

The improved drilling fluids of this invention are basically comprised of water or oil based fluids containing viscosity increasing materials, and other components as well as a hardenable epoxy sealant composition dispersed therein which becomes a part of the filter cake formed on the walls of the well bore. The epoxy sealant composition hardens in the filter cake thereby consolidating the filter cake into a stable solid mass. The strength and other properties of the consolidated filter cake are sufficient to prevent or minimize fluid loss from the drilling fluid, lost drilling fluid circulation and the influx of pressurized formation gas into the well bore during and after sealing pipe therein.

The hardenable epoxy sealant composition dispersed in the drilling fluid is basically comprised of an epoxide containing liquid and a hardening agent. While various low viscosity epoxide containing liquids can be used, preferred such liquids are selected from the group of diglycidyl ethers of 1,4-butanediol, neopentyl glycol and cyclohexane dimethanol. A suitable epoxide containing liquid comprised of the diglycidyl ether of 1,4-butanediol is commercially available from the Shell Chemical Company of Houston, Tex. under the tradename "HELOXY® 67". This epoxide containing liquid has a viscosity at 25° C. in the range of from about 13 to about 18 centipoises, a molecular weight of 202 and a 1 gram equivalent of epoxide per about 120 to about 130 grams of the liquid. A suitable diglycidyl ether of neopentyl glycol is commercially available from Shell Chemical Company under the trade designation "HELOXY® 68". This epoxy containing liquid has a viscosity at 25° C. in the range of from about 13 to about 18 centipoises, a molecular weight of 216 and a 1 gram equivalent of epoxide per about 130 to about 140 grams of the liquid. A suitable diglycidyl ether of cyclohexane dimethanol is commercially available from Shell Chemical Company under the trade designation "HELOXY® 107". This epoxide containing liquid has a viscosity at 25° C. in the range of from about 55 to about 75 centipoises, a molecular weight at 256 and a 1 gram equivalent of epoxide per about 155 to about 165 grams of the liquid.

A variety of hardening agents including, but not limited to, amines and carboxylic acid anhydrides can be utilized. The amines can be aliphatic amines, aliphatic tertiary amines, aromatic amines, cycloaliphatic amines, heterocyclic amines, amido amines, polyamides and polyethyl amines. Examples of suitable aliphatic amines are triethylenetetramine, ethylenediamine, N-cocoalkyltrimethylenediamine, isophoronediamine, N-aminoethylpiperazines, imidazoline and 1,2-diaminecyclohexane. Examples of suitable carboxylic acid anhydrides are methyltetrahydrophathalic anhydride, hexahydrophathalic anhydride, maleic anhydride, polyazelaic polyanhydride and phthalic anhydride. Of the various hardening agents which can be used, triethylenetetramine, N-cocoalkyltrimethylenediamine, isophoronediamine and diethyltoluenediamine are preferred, with isophoronediamine and diethyltoluenediamine being the most preferred. The hardening agent utilized is generally included in the epoxy sealant composition in an amount in the range of from about 15% to about 31% by weight of the epoxide containing liquid in the composition, most preferably about 25%.

In applications where a higher viscosity epoxide sealing composition can be used, i.e., a viscosity in the range of from about 90 to about 120 centipoises, an epoxide resin composition comprised of an epoxy resin, an epoxide containing liquid and a hardening agent is utilized. While various epoxy resins can be used, preferred such resins are those selected from the condensation products of epichlorohydrin and bisphenol A. A particularly suitable such resin is commercially available from the Shell Chemical Company under the trade designation "EPON® RESIN 828". This epoxy resin has a molecular weight of 340 and a 1 gram equivalent of epoxide per about 180 to about 195 grams of resin.

The epoxide containing liquid, preferably an epoxide containing liquid selected from the group of diglycidyl ethers of 1,4-butanediol, neopentyl glycol and cyclohexane dimethanol, is utilized to modify the viscosity of the epoxy resin used and add flexibility and resiliency to the resulting composition after hardening. The epoxide containing liquid is included in the epoxy resin composition in an amount in the range of from about 15% to about 40% by weight of the epoxy resin in the composition, most preferably in an amount of about 25%.

The hardening agent is preferably selected from the group of aliphatic amines and acid anhydrides set forth above, with triethylenetetramine, ethylenediamine, N-cocoalkyltrimethylenediamine, isophoronediamine and diethyltoluenediamine being preferred. The most preferred hardening agents are isophoronediamine and diethyltoluenediamine. The hardening agent is included in the epoxy resin composition in an amount in the range of from about 5% to about 45% by weight of the composition, preferably in an amount in of about 30%.

The above described epoxy sealant compositions can include fillers such as crystalline silicas, amorphous silicas, clays, calcium carbonate or barite. When used, the filler can be present in the composition in an amount up to about 150% by weight of the composition.

The improved methods of drilling a subterranean well bore of this invention are basically comprised of the steps of preparing a water or oil based drilling fluid of this invention which forms a filter cake on the walls of a well bore as the well bore is drilled which includes a hardenable epoxy sealant composition as described above. The hardenable epoxy sealant composition is dispersed in the drilling fluid and becomes a part of the filter cake formed on the walls of the well bore by the drilling fluid. Thereafter, the sealing composition hardens whereby the filter cake is consolidated into a stable solid mass which prevents or reduces fluid loss from the drilling fluid, lost drilling fluid circulation and gas migration into the well bore during or after the sealing of pipe therein.

After the well bore is drilled, a string of pipe such as casing is generally run into the well bore and sealed therein. The string of pipe is sealed in the well bore in accordance with the present invention by placing an epoxy sealant composition of the type described above in the annulus between the pipe and the walls of the well bore and allowing the epoxy sealant composition to harden therein. Because the walls of the well bore were previously consolidated by an epoxy sealant composition, the epoxy sealant composition introduced into the annulus readily bonds to the consolidated filter cake and to the string of pipe being sealed. As mentioned above, the epoxy sealant compositions utilized in accordance with this invention have very good bonding abilities and upon hardening are very resilient. As a result, the hardened annular sheath of epoxy sealant bonded in the well bore and to the pipe can withstand a variety of pipe movements brought on by expansion and the like without failure.

In order to further illustrate the drilling fluids and methods of this invention, the following examples are given.

EXAMPLE 1

A number of epoxy sealant compositions useful in accordance with this invention were prepared containing the components and in the amounts shown in the Table below. The compositions were tested for thickening times, compressive strengths, shear bond strengths and tensile strengths in accordance with the procedures set forth in *API Specification For Materials And Testing For Well Cements,* API Specification 10, 5th Edition, dated Jul. 1, 1990 of the American Petroleum Institute. The results of these tests are set forth in Table I below:

TABLE I

| EPOXY SEALANT COMPOSITION PROPERTIES | | | | | | | | |
|---|---|---|---|---|---|---|---|---|
| Epoxy Containing Liquid | Sealant Composition Components | | | | | Thickening Time To 100 Bc, hr:min | | |
| | Quantity, Grams | Hardening Agent | Quantity, Grams | Filler | Quantity Grams | 100° F. | 150° F. | 200° F. |
| Diglycidal Ether of 1,4-Butanediol[1] | 400 | Diethyl-toluene-diamine[2] | 132 | Micro-sand | 600 | — | 10:45 | 3:45 |
| Diglycidal Ether of 1,4-Butanediot[1] | 400 | Diethyl-toluene-diamine[2,3] | 132 | Micro-sand | 600 | — | 4:00 | — |
| Diglycidal Ether of 1,4-Butanediol | 400 | Isophrone diamine[4] | 130 | Micro-sand | 600 | 2:15 | — | — |

| Epoxy Containing Liquid | Compressive Strength, psi | | | Shear Bond[5] Strength, psi | | | Tensile Strength[6], psi | | |
|---|---|---|---|---|---|---|---|---|---|
| | 100° F. | 150° F. | 190° F. | 140° F. | 240° F. | 280° F. | 140° F. | 240° F. | 280° F. |
| Diglycidal Ether of 1,4-Butanediol[1] | — | 10,300 (72 hrs) | 7,800 (24 hrs) | — | — | 103 | — | — | 176 |
| Diglycidal Ether of 1,4-Butanediot[1] | — | 3,610 (24 hrs) | — | — | 101 | — | — | 246 | — |
| Diglycidal Ether of 1,4-Butanediol | 6,033 (24 hrs) | — | — | 255 | — | — | 1832 | — | — |

[1]"HELOXY ® 67" from Shell Chemical Co.
[2]"EPI-CURE ®" from Shell Chemical Co.
[3]Composition also included 15 grams of "EPI-CURE ®" 3253 catalyst (dimethylaminomethylphenol) from Shell Chemical Co.
[4]"Vestamine ® IPD" from Hulls of America, Inc.
[5]Average of three cylinders cured at temperature of 72 hrs.
[6]Average of three cubes cured at temperature for 72 hrs.

From Table I, it can be seen that the epoxy sealant compositions have excellent properties for sealing filter cake solids and pipe strings in well bores.

EXAMPLE 2

Various epoxy sealant compositions mixed with drilling fluids were prepared and tested for compressive strengths at 150° F. in accordance with the above mentioned API Specification 10. The composition components and their quantities as well as the test results are shown in Table II below.

TABLE II

EPOXY SEALANT COMPOSITION - DRILLING FLUID MIXTURE STRENGTHS

| | | Sealant Composition Components | | | | | Volume Ratio of Sealant | |
|---|---|---|---|---|---|---|---|---|
| Containing Epoxy | Volume, cc | Hardening Agent | Quantity, Grams | Filler (Density of Mixture) | Quantity Liquid Grams | Drilling Fluid | Composition to Drilling Fluid | Compressive Strength, psi |
| Diglycidyl Ether of Neopentyl Glycol | 337.5 | Isophrone-diamine and Triethanol-amine | 30.7<br><br>23.1 | Barite[1] (16.2 lb/gal) | 541 | Aqueous Lime Based[3] | 1:1 | 140 (24 hrs) |
| 75% by Vol Epoxy Resin[2] and 25% by vol. Diglycidyl Ether of Cyclohexane Dimetbanol | 350 | Tetraethylene-diamine | 22.54 | None (11.2 lb/gal) | — | Aqueous Lime Based[3] | 1:1 | 1733 (24 hrs) |
| Diglycidyl Ether of Cyclohexane Dimethanol | 350 | Isophrone-diamine | 83.7 | None (11.2 lb/gal) | — | Aqueous Lime Based[3] | 1:1 | 4860 (72 hrs) |
| Diglycidyl Ether of Cyclohexane Dimethanol | 245 | Isophrone-diamine and Triethanol-amine | 32.1<br><br>25.7 | Barite[1] (16.2 lb/gal) | 391 | Aqueous Lime Based[3] | 2.5:1 | 428 (24 hrs) |
| Diglycidyl Ether of Cyclohexane Dimethanol | 225 | Isophrone-diamine and Triethanol-amine | 15.4<br><br>20.5 | Barite[1] (16.2 lb/gal) | 361 | Aqueous Lime Based[3] | 1:1 | 721 (24 hrs) |
| Diglycidyl Ether of Cyclohexane Dimethanol | 225 | Isophorone-diamine | 50 | None[4] (13.3 lb/gal) | — | Oil Based[5] | 1:1 | 410 (24 hrs) |

[1]Sealant compostion also included a water wetting surfactant comprised of nonylphenol ethoxylated with 8 to 10 moles of ethylene oxide and terminating with a sodium carboxylate group.
[2]"EPON ® RESIN 828" from Shell Chemical Co.
[3]Drilling fluid was comprised of water, aluminum citrate, lime, barite, bentonite, caustic, lignosulfonate, a polymer blend and a polyanionic cellulose, and had a density of 16.2 lb/gal.
[4]Sealant composition also included a surfactant comprised of ethoxylated alkyl alcohol ammonium sulfate and a mutual solvent comprised of a mixture of ethylene glycol monobutyl ether and ethoxylated alcohol.
[5]Drilling fluid was comprised of diesel oil, calcium chloride solution (25% by weight aqueous solution), emulsifier blend, barite, lime, organophilic clay, blend of gilsonite/asphalt based additive, wetting additive and dispersing additive.

From Table II it can be seen that the tested mixtures of sealant composition and drilling fluid set into hard solid masses having good compressive strengths.

EXAMPLE 3

An epoxy sealant composition was prepared comprised of 600 grams of diglycidyl ether of cyclohexane dimethanol ("HELOXY® 107" from Shell Chemical Company), 600 grams of microsand and 140 grams of diethyltoluenediamine ("EPI-CURE®(R)W" from Shell Chemical Company). The epoxy sealant composition was allowed to harden in a cylinder for 24 hours at 250° F. The weight of the resulting hardened cylindrical composition was determined to be 272.36 grams. The cured composition was then submerged in crude oil in an autoclave at 250° F. for 72 hours. At the end of the 72 hours, the composition was rinsed with acetone and it was again weighed. The weight was determined to be 272.68 grams. Thus, the hardened epoxy sealant composition was not dissolved or otherwise weakened by prolonged contact with hot crude oil as would be the case when the epoxy resin was used to seal filter cake solids and/or a pipe string in a well bore penetrating a deep crude oil reservoir.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved drilling fluid for use in drilling a subterranean well bore which forms fluid loss reducing filter cake on the walls of the well bore comprising:
    a base fluid selected from the group of water and oil;
    a viscosity increasing material; and
    a hardenable epoxy sealant composition which becomes a part of said filter cake formed on the walls of said well bore and hardens therein whereby said filter cake is consolidated into a stable solid mass, said epoxy sealant composition comprising an epoxide containing liquid and a hardening agent.

2. The drilling fluid of claim 1 wherein said epoxide containing liquid is selected from the group of diglycidyl ethers of 1,4-butanediol, neopentyl glycol and cyclohexane dimethanol.

3. The drilling fluid of claim 1 wherein said hardening agent is selected from the group of aliphatic amines and anhydrides.

4. The drilling fluid of claim 1 wherein said hardening agent is selected from the group of triethylenetetramine, ethylenediamine, N-cocoalkyltrimethylenediamine, isophoronediamine and diethyltoluenediamine and is present in said composition in an amount in the range of from about 15% to about 31% by weight of said epoxide containing liquid in said composition.

5. The drilling fluid of claim 1 wherein said hardening agent is isophoronediamine present in said composition in an amount of about 25% by weight of said epoxide containing liquid in said composition.

6. The drilling fluid of claim 1 wherein said epoxy composition further comprises a filler selected from the group consisting of crystalline silicas, amorphous silicas, clays, calcium carbonate and barite.

7. An improved drilling fluid for use in drilling a subterranean well bore which forms fluid loss reducing filter cake on the walls of the well bore comprising:

a base fluid selected from the group of water and oil;

a water viscosity increasing material; and a hardenable epoxy sealant composition which becomes a part of said filter cake deposited on the walls of said well bore and hardens therein whereby said filter cake is consolidated into a stable solid mass, said epoxy sealant composition comprising an epoxy resin selected from the group of condensation products of epichlorohydrin and bisphenol A, an epoxide containing liquid and a hardening agent.

8. The drilling fluid of claim 7 wherein said epoxide containing liquid is selected from the group of diglycidyl ethers of 1,4-butanediol, neopentyl glycol and cyclohexane dimethanol and is present in said composition in an amount in the range of from about 15% to about 40% by weight of said epoxy resin in said composition.

9. The drilling fluid of claim 7 wherein said hardening agent is selected from the group of triethylenetetramine, ethylenediamine, N-cocoalkyltrimethylenediamine, isophoronediamine and diethyltoluenediamine and is present in said composition in an amount in the range of from about 5% to about 45% by weight of said composition.

10. The drilling fluid of claim 7 wherein said epoxide containing liquid is the diglycidyl ether of cyclohexane dimethanol and is present in said composition in an amount of about 25% by weight of said epoxy resin in said composition.

11. The drilling fluid of claim 7 wherein said hardening agent is isophoronediamine and is present in said composition in an amount of about 30% by weight of said composition.

12. The drilling fluid of claim 7 wherein said epoxy resin composition further comprises a filler selected from the group consisting of crystalline silicas, amorphous silicas, clays, calcium carbonate and barite.

13. The drilling fluid of claim 12 wherein said filler is present in said composition in an amount in the range of from about 15% to about 150% by weight of said composition.

14. An improved method of drilling a subterranean well bore comprising the steps of:

preparing a drilling fluid which forms a filter cake on the walls of a well bore as said well bore is drilled comprised of a base fluid selected from the group of water and oil, a viscosity increasing material and a hardenable epoxy sealant composition which becomes a part of said filter cake formed on the walls of said well bore and hardens therein whereby said filter cake is consolidated into a stable solid mass, said epoxy sealant composition comprising an epoxide containing liquid and a hardening agent; and drilling said well bore using said drilling fluid.

15. The method of claim 14 wherein said epoxy sealant composition further comprises an epoxy resin selected from the group of condensation products of epichlorohydrin and bisphenol A.

16. The method of claim 15 wherein said epoxy resin has a molecular weight of about 340 and a one gram equivalent of epoxide per about 180 to about 195 grams of resin.

17. The method of claim 15 wherein said epoxide containing liquid is selected from the group of diglycidyl ethers of 1,4-butanediol, neopentyl glycol and cyclohexane dimethanol and is present in said composition in an amount in the range of from about 15% to about 40% by weight of said epoxy resin in said composition.

18. The method of claim 17 wherein said epoxide containing liquid is the diglycidyl ether of cyclohexane dimethanol and present in said composition in an amount of about 25% by weight of said epoxy resin in said composition.

19. The method of claim 14 wherein said epoxide containing liquid is selected from the group of diglycidyl ethers of 1,4-butanediol, neopentyl glycol and cyclohexane dimethanol.

20. The method of claim 14 wherein said hardening agent is selected from the group of triethylenetetramine, ethylenediamine, N-cocoalkyltrimethylenediamine, isophoronediamine and diethyltoluenediamine and is present in said composition in an amount in the range of from about 5% to about 45% by weight of said composition.

21. The method of claim 14 wherein said hardening agent is isophoronediamine and is present in said composition in an amount of about 30% by weight of said composition.

22. The method of claim 14 wherein said epoxy sealant composition further comprises a filler selected from the group consisting of crystalline silicas, amorphous silicas, clays, calcium carbonate and barite.

23. The method of claim 14 wherein said filler is present in said composition in an amount in the range of from about 15% to about 150% by weight of said composition.

24. The method of claim 14 which is further comprised of the steps of:

running a string of pipe in said well bore;

placing an epoxy sealant composition comprised of an epoxide containing liquid and a hardening agent between said pipe and the walls of said well bore; and allowing said epoxy sealant composition to harden therein.

25. The method of claim 24 wherein said epoxy sealant composition further comprises an epoxy resin selected from the group of condensation products of epichlorohydrin and bisphenol A.

26. The method of claim 25 wherein said epoxy sealant composition further comprises a filler selected from the group consisting of crystalline silicas, amorphous silicas, clays, calcium carbonate and barite.

* * * * *